United States Patent
Ghazanfari

(10) Patent No.: US 10,746,349 B2
(45) Date of Patent: Aug. 18, 2020

(54) EXTENDABLE CAGE TELESCOPIC SYSTEM

(71) Applicant: Hamaye Co, Tehran (IR)

(72) Inventor: Abbas Ghazanfari, Tehran (IR)

(*) Notice: Subject to any disclaimer, the term of this patent is extended or adjusted under 35 U.S.C. 154(b) by 0 days.

(21) Appl. No.: 15/871,545

(22) Filed: Jan. 15, 2018

(65) Prior Publication Data

US 2018/0135794 A1    May 17, 2018

(51) Int. Cl.
| | | |
|---|---|---|
| F16M 11/26 | (2006.01) | |
| F16M 11/18 | (2006.01) | |
| F16B 7/14  | (2006.01) | |
| F16M 11/28 | (2006.01) | |
| E04H 12/18 | (2006.01) | |
| H01Q 1/12  | (2006.01) | |
| E04H 12/08 | (2006.01) | |
| E04H 12/10 | (2006.01) | |
| H01Q 1/10  | (2006.01) | |

(52) U.S. Cl.
CPC ............ *F16M 11/26* (2013.01); *E04H 12/182* (2013.01); *F16B 7/14* (2013.01); *F16M 11/18* (2013.01); *F16M 11/28* (2013.01); *H01Q 1/1235* (2013.01); *E04H 12/085* (2013.01); *E04H 12/10* (2013.01); *F16M 2200/027* (2013.01); *H01Q 1/10* (2013.01)

(58) Field of Classification Search
CPC ........... E04H 12/182; E04C 2003/0495; E04C 3/005; E04C 2003/0413; F16M 11/28; F16M 11/26; F16M 11/18; H01Q 1/1235; H01Q 1/10
USPC ....... 248/188.5, 157, 333; 52/118, 632, 121, 52/117, 123.1
See application file for complete search history.

(56) References Cited

U.S. PATENT DOCUMENTS

| | | | | |
|---|---|---|---|---|
| 1,998,367 | A * | 4/1935 | Hammel ................ | E04H 12/10 219/56 |
| 2,761,531 | A * | 9/1956 | Anderson .............. | E04H 12/10 52/152 |
| 3,495,370 | A * | 2/1970 | Habro ................... | B21C 37/151 52/118 |
| 3,776,500 | A * | 12/1973 | Foderaro ............. | A61B 6/4464 248/333 |
| 4,357,785 | A * | 11/1982 | Eklund ................ | E04H 12/182 212/350 |
| 4,752,102 | A * | 6/1988 | Rasmussen .......... | A47C 3/24 108/147 |

(Continued)

*Primary Examiner* — Jonathan Liu
*Assistant Examiner* — Taylor L Morris
(74) *Attorney, Agent, or Firm* — Barry Choobin; Patent 360

(57) ABSTRACT

The embodiments herein provide an extendable mechanism comprising several identical telescopic members. The telescopic members comprises a base member, an intermediate member and an end effector member which are designed to slide with respect to each other along a common axis. The base member is attached on a moving base. The intermediate member is configured to move relatively with respect to the base member. The end effector member is extended from the intermediate member. The telescopic member comprises three identical cylindrical rods connected between an exterior ring and an interior ring. The cylindrical rods are perpendicular to the exterior ring and aligned along the common axis of the telescopic members.

14 Claims, 6 Drawing Sheets

(56) References Cited

U.S. PATENT DOCUMENTS

| | | | | |
|---|---|---|---|---|
| 5,085,018 A * | 2/1992 | Kitamura | H01Q 1/1235 | 52/108 |
| 5,101,215 A * | 3/1992 | Creaser, Jr. | E04H 12/182 | 343/883 |
| 5,379,566 A * | 1/1995 | Schworer | E04G 25/04 | 52/632 |
| 5,524,398 A * | 6/1996 | Miller | B60P 3/18 | 182/207 |
| 5,537,125 A * | 7/1996 | Harrell, Jr. | E04H 12/182 | 248/188.5 |
| RE37,559 E * | 2/2002 | Marue | B60P 3/18 | 248/188.5 |
| 6,418,949 B1 * | 7/2002 | Lin | A45B 19/04 | 135/25.1 |
| 6,425,712 B1 * | 7/2002 | Vanderklaauw | B66F 1/025 | 405/230 |
| 6,970,143 B2 * | 11/2005 | Allen | H01Q 15/20 | 343/880 |
| 7,574,832 B1 * | 8/2009 | Lieberman | E04H 12/10 | 212/350 |
| 8,046,970 B2 * | 11/2011 | Diniz | E04H 12/182 | 52/123.1 |
| 8,234,823 B2 * | 8/2012 | McClure | E04H 12/182 | 52/111 |
| 8,276,326 B2 * | 10/2012 | Lounis | B66F 11/00 | 212/199 |
| 8,494,725 B2 * | 7/2013 | Zurfluh | H01Q 1/10 | 248/157 |
| 8,522,511 B2 * | 9/2013 | Thoren | E04H 12/182 | 52/118 |
| 8,549,812 B1 * | 10/2013 | Peng | E04B 1/34305 | 212/348 |
| 8,770,522 B1 * | 7/2014 | Murphey | B64G 1/222 | 244/159.4 |
| 8,955,264 B2 * | 2/2015 | Edwards | E04H 12/34 | 52/118 |
| 9,371,663 B2 * | 6/2016 | Pereira | E04H 12/085 | |
| 9,376,292 B2 * | 6/2016 | Knecht | B66C 23/36 | |
| 2004/0134529 A1 * | 7/2004 | Stoeckler | E04H 15/46 | 135/114 |
| 2006/0150572 A1 * | 7/2006 | Rawson-Harris | E04C 3/32 | 52/848 |
| 2011/0240817 A1 * | 10/2011 | Lee | B25J 5/04 | 248/333 |
| 2014/0059949 A1 * | 3/2014 | Lounis | E04H 12/182 | 52/118 |
| 2014/0174016 A1 * | 6/2014 | Diniz | E04H 12/182 | 52/632 |
| 2014/0311057 A1 * | 10/2014 | Puetz | E04H 12/182 | 52/121 |

* cited by examiner

EXTENDABLE CAGE TELESCOPIC SYSTEM

BACKGROUND

Technical Field

The embodiments herein are generally related to telescopic mechanism. The embodiments herein are particularly related to an extendable mechanism comprising telescopic mechanism. The embodiments herein are more particularly related to an extendable arm comprising cage telescopic mechanism for telescopic mast or arm for moving payloads to a given location.

Description of the Related Art

In many practical applications, an extendable arm or mast is required for lowering and raising weights or to move payloads to a given position. It has been recognized that the telescopic mechanisms are advantageous for such applications. Telescoping in mechanics discloses a movement of one part sliding out from another, lengthening an object from a rest state or position. Telescopic mechanism is used as portable columns for telecommunication and surveillance towers or in construction sites. There are several applications for the telescopic mechanism exist in ship industry, space exploration, and robotic industry.

A telescopic mechanism is an extendable mast, comprising a plurality of inter-coupled slidable parts. One telescoping member of the telescopic mechanism is usually fixed to a moving or stationary base and the far end of the mechanism can be extended to a specified position by relative motion of the members with respect to each other.

In conventional telescopic mechanism, all the telescoping members are nesting, one inside another, to form a nested compact size mechanism in which the linear joints are distributed radially all through the mechanism. In the other word, the linear joints between any two adjacent members lies in different radial distance with respect to the mechanism axis. By relative motion of the telescoping members with respect to each other the far end of the telescopic mechanism is positioned at a specified location.

During a telescopic movement, each member is guided in translational direction through the sliding joints that constrain the members to each other. The transmission mechanism is equipped with the actuators or is a manual hand driven system to provide a continuous change or variation in length. To measure the overall length of the mechanism, the telescopic mechanism is equipped with a sensory system in order to have a precise control over the mechanism length. The telescopic members are locked to each other via a mechanical brake placed at the upper or lower section of the telescoping members or by an actuator lock. Telescopic mechanism is used as a temporarily variable length mast or columns for construction, and portable telecommunication and broadcasting towers. The telescopic arm is also used as a precise linear arm to hold a tool at a specific position for orienting applications and moving toward a target.

In view of the above discussion, there is a need a for a cage telescopic mechanism provided with identical concentric inner members. Yet there is a need for a cage telescopic mechanism provided with identical concentric inner members connected in a novel way to each other. Still further there is a need for a cage telescopic mechanism provided with identical concentric inner members that are coupled circumferentially to one another. Yet further there exists need for an extendable arm that is stable, rigid and durable.

Yet further there exists need for an extendable arm comprising a plurality of telescoping members having an identical cross section diameter to provide a highly stiff telescopic structure. Yet further there exists need for an extendable arm in which the joints are distributed in the same radial distance with respect to the mechanism axis, and the members are coupled circumferentially. Further, there is need for an improved design of extendable arm to overcome the drawbacks of the conventional telescopic mechanism.

The above mentioned shortcomings, disadvantages and problems are addressed herein and which will be understood by reading and studying the following specification.

OBJECTS OF THE EMBODIMENTS

The primary object of the embodiments herein is to provide an extendable mechanism having identical telescoping members.

Another object of the embodiments herein is to provide an extendable mechanism with identical cross section, for providing durability and stiffness.

Yet another object of the embodiments herein is to provide an extendable mechanism with cage telescopic mechanism.

Yet another object of the embodiments herein is to provide an extendable mechanism with a plurality of rods mounted on two plates present at distal ends.

Yet another object of the embodiments herein is to provide an extendable mechanism that is rigid.

Yet another object of the embodiments herein is to provide an extendable mechanism with a plurality of cylindrical rods for coupling the telescopic members.

Yet another object of the embodiments herein is to provide a highly stiff extendable mechanism comprising a plurality of slidable inter-coupled telescoping members.

Yet another object of the embodiments herein is to provide an extendable mechanism having identical telescoping member and identical cross section to provide more durability and stiffness.

Yet another object of the embodiments herein is to provide an extendable mechanism with a cage telescopic mechanism having a plurality of concentric telescoping members extended upward from a base.

Yet another object of the embodiments herein is to provide an extendable mechanism with a cage telescopic mechanism having a plurality of concentric telescoping members connected to each other.

Yet another object of the embodiments herein is to provide an extendable mechanism with a cage telescopic mechanism in which a joint between any two members of the mechanism lies in the same radial distance with respect to the mechanism axis.

Yet another object of the embodiments herein is to provide an extendable mechanism with a cage telescopic mechanism having a plurality of concentric telescoping members coupled circumferentially to each other.

Yet another object of the embodiments herein is to provide an extendable mechanism with a cage telescopic mechanism having a plurality of rods that are mounted on two plates at two ends.

Yet another object of the embodiments herein is to provide an extendable mechanism with a cage telescopic mechanism having at least three members, respectively known as a base, an intermediate member and an end effecter of the mechanism.

Yet another object of the embodiments herein is to provide an extendable mechanism with a cage telescopic mechanism that is extended by coupling extra intermediate telescoping members.

Yet another object of the embodiments herein is to provide an extendable mechanism with a cage telescopic mechanism having a plurality of concentric telescoping members with an identical cross section diameter to provide a highly stiff telescopic structure.

Yet another object of the embodiments herein is to provide an extendable mechanism with a cage telescopic mechanism having a plurality of concentric telescoping members coupled to each other through the connecting rods and joints.

Yet another object of the embodiments herein is to provide an extendable mechanism with a cage telescopic mechanism having a plurality of concentric telescoping members confined to move along a common axis.

Yet another object of the embodiments herein is to provide an extendable mechanism with a cage telescopic mechanism having a plurality of concentric telescoping members coupled through connecting rods that freely move through the linear joints of the telescopic mechanism.

Yet another object of the embodiments herein is to provide an extendable mechanism with a cage telescopic mechanism having a plurality of concentric telescoping members connected through the linear joints that are positioned at the free spaces between the connecting rods in interior and exterior rings.

Yet another object of the embodiments herein is to provide an extendable mechanism with a cage telescopic mechanism comprising a plurality of concentric telescoping members having equal cross section and identical joint distribution.

Yet another object of the embodiments herein is to provide an extendable mechanism with a cage telescopic mechanism having a plurality of concentric telescoping members that are joint to each other and arranged in circumferential with an offset angle with respect to each other.

Yet another object of the embodiments herein is to provide an extendable mechanism with a cage telescopic mechanism for an extendable portable mast or arm to position any payloads such as an antenna or a camera or any other surveillance system at a specified position.

Yet another object of the embodiments herein is to provide an extendable mechanism with a cage telescopic mechanism having a plurality of concentric telescoping members for use in aerospace, shipping, robotics and construction industry.

These and other objects and advantages of the embodiments herein will become readily apparent from the following detailed description taken in conjunction with the accompanying drawings.

SUMMARY

The various embodiments herein provide an extendable mechanism with a plurality of telescopic members of uniform cross-section. According to an embodiment herein, the extendable mechanism includes a plurality of identical telescoping members that are coupled to each other through a plurality of connecting rods. Additionally, the identical cross section of the telescopic members provides more durability and stiffness to the telescopic mechanism.

According to an embodiment herein, an extendable mechanism with telescopic members comprises a plurality of identical telescopic members. The plurality of telescopic members comprise at least a base member, an intermediate member and an end effect member. The base member, the intermediate member and the end effect member are configured to slide with respect to each other along a common axis. The base member is attached or mounted on a moving base. The intermediate member is configured to move relatively with respect to the base member. The end effecter member is extended from the intermediate member. Each telescopic member comprises an exterior ring and an interior ring. The interior and exterior rings of the members of the telescopic mechanism are connected to each other via connecting rods. The connecting rods is of circular cross section or square cross section.

According to an embodiment herein, a plurality of identical cylindrical rods is connected to the exterior ring. The plurality of cylindrical rods is arranged perpendicular to the exterior ring. The plurality of cylindrical rods are aligned along a common axis of the plurality of telescopic members. The plurality of cylindrical rods comprises at least two cylindrical rods. The plurality cylindrical rods are evenly distributed along an interior perimeter of the exterior ring with same angular distance.

According to an embodiment herein, the telescopic mechanism includes a first set of three grooves having a same cross section with that of the connecting rods are engraved with an equal angular distance at the interior wall of the exterior ring along the circumference of a circle with a same diameter in equal with that of the circle in which the connecting rods are distributed, and wherein the three groves have an angular distance of 40 degree with respect to the position of the connecting rods in such a way that the rods of neighboring telescopic member freely move along the grooves of the other member without any interference with each other. The telescopic mechanism includes a second set of three groves engraved on the exterior wall of the internal ring at an equal angular distance, and with an equal angular distance along the circumference of a circle with a same diameter in equal with that of the circle in which the connecting rods are distributed, while having an angular distance of 80 degree with respect to the position of the connecting rods in such a way that the rods of neighboring telescopic member can freely move along the grooves of the other member without any interference with each other.

According to an embodiment herein, a plurality of linear joints is positioned both on an interior perimeter of the exterior ring and on an exterior perimeter of interior ring respectively. The plurality of linear joints is designed to make a translational motion.

According to an embodiment herein, a brake system is mounted on the exterior rings to limit a movement of the plurality of telescopic members at an end.

According to an embodiment herein, the connecting rods of the base member is coupled respectively to the grooves of the exterior ring of the intermediate member to allow free movement through the grooves.

According to an embodiment herein, the connecting rods is of circular cross section or square cross section.

According to an embodiment herein, the connecting rods of the base member is coupled respectively to the grooves of the interior ring of the base member at one end and also the exterior ring of the end effecter member at the other end, thereby allowing free movement through the holes.

According to an embodiment herein, the plurality of the cylindrical connecting rods of the base member is coupled respectively to the plurality of cylindrical holes of the exterior ring of the intermediate member. The plurality of cylindrical holes of the base member is coupled to the plurality of cylindrical connecting rods of the intermediate member.

According to an embodiment herein, the mechanism further comprises at least two telescopic members without the intermediate member.

According to an embodiment herein, a profile of the interior ring is designed to completely lie or nest inside the interior area of the profile of the exterior ring.

According to an embodiment herein, the number of telescopic members is more than three. The extendable mechanism is extended by adding a plurality of intermediate members.

According to an embodiment herein, the exterior ring and the interior ring is of any geometrical shape. The interior ring is nested within the exterior ring.

According to an embodiment herein, the plurality of connecting rods are of any cross section. The cross section of the plurality of connecting rods provided between the exterior ring and the interior ring is similar.

According to an embodiment herein, a position of the far end of the mechanism at the end effecter is controlled through a relative motion of the plurality of the telescopic members with respect to each other along a common axis of movement.

According to an embodiment herein, the plurality of cylindrical holes are replaced by a suitable linear joint to confine a movement of the plurality of telescopic members along the common axis.

According to an embodiment herein, the plurality of connecting rods positioned between the pluralities of telescopic members are of varying length. The plurality of connecting rods of an individual telescopic member are of similar length.

According to an embodiment herein, the plurality of linear joints is any one of a pulley type, ball bearing type, and frictional material.

According to an embodiment herein, the plurality of linear joints on the exterior and interior rings are spur gears or worm gear. The plurality of cylindrical rods are integrated with a suitable rack gear to provide a linear constraint between the joint and the rod.

According to an embodiment herein, the plurality of telescopic members are driven with a motor or manually driven by hand through a suitable power transmission mechanism.

According to an embodiment herein, the plurality of telescopic members are equipped with sensory system to measure a position of the plurality of telescopic members with respect to each other and to measure a far end of the mechanism with respect to the base member.

According to an embodiment herein, an axis of the motion of the plurality of telescopic members is a circular or spiral. The plurality of connecting rods have a suitable profile corresponding to a profile an axis of the motion of the plurality of telescopic members.

According to an embodiment herein, a plurality of cage telescopic mechanism is nested.

According to an embodiment herein, a two cage telescopic mechanism is designed to nest with each other. One cage telescopic mechanism is designed to move an inside the interior ring of the far end member of the mechanism with respect to base member.

According to an embodiment herein, the plurality of connecting rods, the first set of grooves and the second set of grooves are distributed along circles with same diameter.

According to an embodiment herein, the extendable mechanism with a cage telescopic mechanism comprises a plurality of concentric telescoping members extended upward from a base. The unique feature of the present invention is the method by which the members are jointed/connected or coupled to each other. The joint between any two members of the mechanism lies in the same radial distance with respect to the mechanism axis. In the other words, the members are coupled circumferentially to each other. The telescoping members includes several rods that are mounted on two plates provided at two distal ends. The cage telescopic mechanism consists of at least three members which comprise a base, an intermediate member and an end effecter of the mechanism. The mechanism is extended by coupling the intermediate telescoping members. All the telescoping members have an identical cross section and diameter to provide a highly stiff telescopic structure.

According to an embodiment herein, the plurality of telescopic members of the cage telescopic mechanism comprises an exterior ring connected through at least one connecting rod, but preferably two rods, to an interior ring. Further, a plurality of linear joints equal to the number of connecting rods are evenly placed at the interior perimeter (inner diameter/perimeter) of the exterior ring as well as the exterior (outer) perimeter (diameter) of interior ring.

According to an embodiment herein, the telescopic members are coupled to each other through the connecting rods and joints. The telescopic members are confined to move along a common axis. The connecting rods are designed to freely move through the linear joints of the telescopic mechanism. The linear joints are positioned at the free spaces between the connecting rods in the interior ring and the exterior ring. In the cage telescopic mechanism, all the members have equal cross section and identical joint distribution. The members of the mechanism are joint/connected/coupled to each other circumferentially in which the members are arranged in circumference with an offset angle with respect to each other.

According to an embodiment herein, the connecting rods of the base member are coupled to the joints of the exterior ring of the intermediate member. The joint of the interior ring of the base is coupled to the connecting rods of the intermediate member. Following the aforementioned principle, all the other telescoping members are coupled to each other in the extendable mechanism.

According to an embodiment herein, the extendable mechanism comprises a plurality of identical telescopic members. The telescopic members comprise a base member, an intermediate member and an end effect member. The base member, the intermediate member and the end effect member slide along a common axis. The base member is attached or mounted on a moving base. The intermediate member is configured to move relatively with respect to the base member. The end effecter member is extendable from the intermediate member. Further, the telescopic member comprises an exterior ring and an interior ring. The mechanism comprises three identical cylindrical rods connected to the exterior ring. The cylindrical rods are perpendicular to the exterior ring and are aligned along the common axis of the telescopic members. The mechanism comprises a plurality of connecting rods coupled to the interior ring and the exterior ring. The connecting rods are evenly distributed along an interior perimeter of the exterior ring with same angular distance. The connecting rods of the base member is coupled to the cylindrical holes of the exterior ring of the intermediate member.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
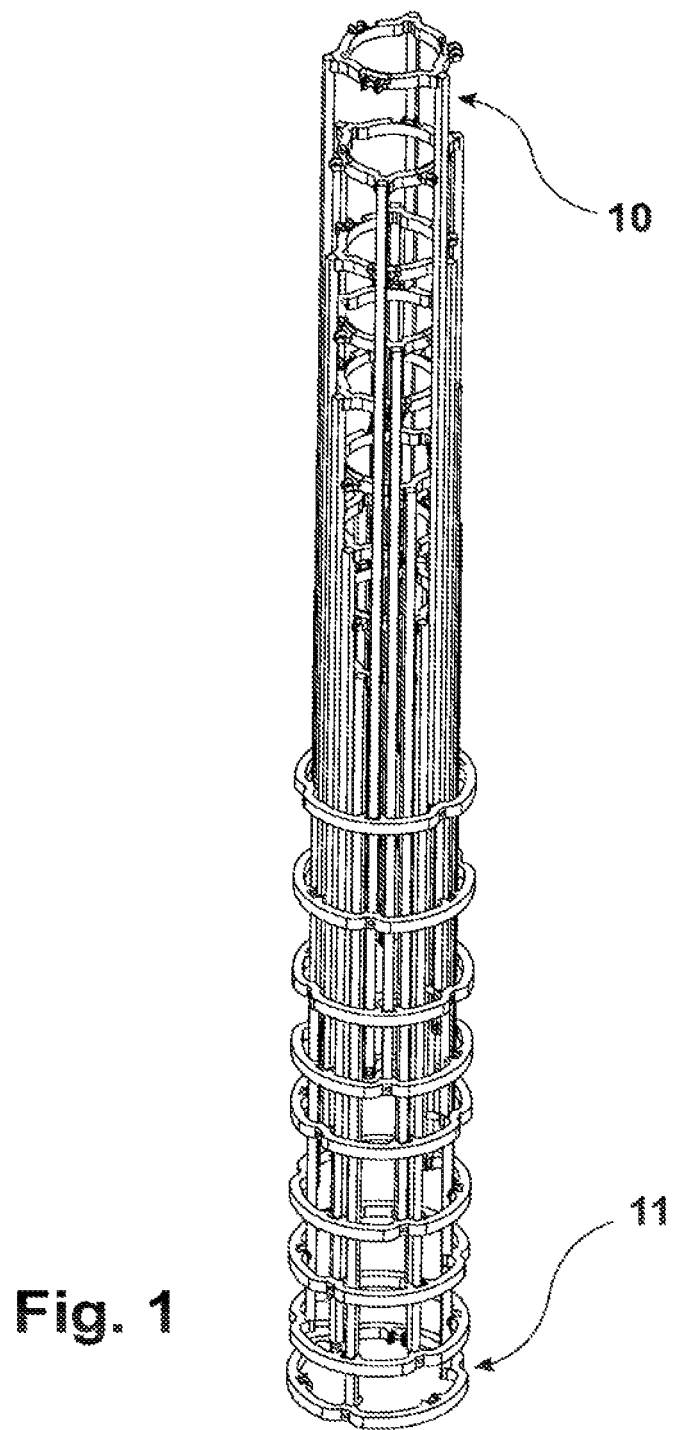
FIG. 1 illustrates a perspective view of the of a cage telescopic mechanism with a plurality of telescopic members, according to an embodiment herein.

Although the specific features of the embodiments are shown in some drawings and not in others. This is done for convenience only as each feature may be combined with any or all of the other features in accordance with the embodiments.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide an extendable mechanism that is used as an extendable portable mast or arm to position any payloads at a specified position. The extendable mechanism includes a plurality of telescopic members with similar radial circumference. According to an embodiment herein, the extendable mechanism is designed to constrain the plurality of telescoping members within each other. Further, a plurality of j oints of the telescopic members in the extendable mechanism are aligned in the same radial distance with respect to the mechanism axis, and the plurality of telescopic members are coupled circumferentially.

According to an embodiment herein, an extendable mechanism with telescopic members comprises a plurality of identical telescopic members. The plurality of telescopic members comprise at least a base member, an intermediate member and an end effect member. The base member, the intermediate member and the end effect member are configured to slide other along a common axis. The base member is attached or mounted on a moving base. The intermediate member is configured to move relatively with respect to the base member. The end effecter member is extended from the intermediate member. Each telescopic member comprises an exterior ring and an interior ring.

According to an embodiment herein, a plurality of identical cylindrical rods is connected to the exterior ring. The plurality of cylindrical rods is arranged perpendicular to the exterior ring. The plurality of cylindrical rods are aligned along a common axis of the plurality of telescopic members. The plurality of cylindrical rods comprises at least two cylindrical rods. The plurality of cylindrical connecting rods are designed to couple the interior ring and the exterior ring. The plurality cylindrical connecting rods are evenly distributed along an interior perimeter of the exterior ring with same angular distance. The connecting rods is of circular cross section or square cross section.

According to an embodiment herein, a plurality of cylindrical holes is provided at the exterior ring of the intermediate member for coupling the plurality of cylindrical connecting rods of the base member. The plurality of cylindrical holes is engraved with an equal angular distance at an exterior wall of the interior ring. The plurality of the cylindrical holes have a diameter which is equal to a diameter of the plurality of cylindrical connecting rods. The plurality of cylindrical holes is positioned with an angular distance of 80 degree with respect to a position of the plurality of cylindrical connecting rods.

According to an embodiment herein, the telescopic mechanism includes a first set of three grooves having a same cross section with that of the connecting rods are engraved with an equal angular distance at the interior wall of the exterior ring along the circumference of a circle with a same diameter in equal with that of the circle in which the connecting rods are distributed, and wherein the three groves have an angular distance of 40 degree with respect to the position of the connecting rods in such a way that the rods of neighboring telescopic member freely move along the grooves of the other member without any interference with each other. The telescopic mechanism includes a second set of three groves engraved on the exterior wall of the internal ring at an equal angular distance, and with an equal angular distance along the circumference of a circle with a same diameter in equal with that of the circle in which the connecting rods are distributed, while having an angular distance of 80 degree with respect to the position of the connecting rods in such a way that the rods of neighboring telescopic member can freely move along the grooves of the other member without any interference with each other.

According to an embodiment herein, a plurality of linear joints is positioned both on an interior perimeter of the exterior ring and on an exterior perimeter of interior ring respectively. The plurality of linear joints is designed to make a translational motion.

According to an embodiment herein, a brake system is mounted on the exterior rings to limit a movement of the plurality of telescopic members at an end.

According to an embodiment herein, the plurality of the cylindrical connecting rods of the base member is coupled respectively to the plurality of cylindrical holes of the exterior ring of the intermediate member. The plurality of cylindrical holes of the base member is coupled to the plurality of cylindrical connecting rods of the intermediate member.

According to an embodiment herein, the mechanism further comprises at least two telescopic members without the intermediate member.

According to an embodiment herein, a profile of the interior ring is designed to completely lie or nest inside the interior area of the profile of the exterior ring.

According to an embodiment herein, the number of telescopic members is more than three. The extendable mechanism is extended by adding a plurality of intermediate members.

According to an embodiment herein, the exterior ring and the interior ring is of any geometrical shape. The interior ring is nested within the exterior ring.

According to an embodiment herein, the plurality of connecting rods are of any cross section. The cross section of the plurality of connecting rods provided between the exterior ring and the interior ring is similar.

According to an embodiment herein, a position of the far end of the mechanism at the end effecter is controlled through a relative motion of the plurality of the telescopic members with respect to each other along a common axis of movement.

According to an embodiment herein, the plurality of cylindrical holes are replaced by a suitable linear joint to confine a movement of the plurality of telescopic members along the common axis.

According to an embodiment herein, the plurality of connecting rods positioned between the pluralities of telescopic members are of varying length. The plurality of connecting rods of an individual telescopic member are of similar length.

According to an embodiment herein, the plurality of linear joints is any one of a pulley type, ball bearing type, and frictional material.

According to an embodiment herein, the plurality of linear joints on the exterior and interior rings are spur gears or worm gear. The plurality of cylindrical rods are integrated with a suitable rack gear to provide a linear constraint between the joint and the rod.

According to an embodiment herein, the plurality of telescopic members are driven with a motor or manually driven by hand through a suitable power transmission mechanism.

According to an embodiment herein, the plurality of telescopic members are equipped with sensory system to measure a position of the plurality of telescopic members with respect to each other and to measure a far end of the mechanism with respect to the base member.

According to an embodiment herein, an axis of the motion of the plurality of telescopic members is a circular or spiral. The plurality of connecting rods have a suitable profile corresponding to a profile an axis of the motion of the plurality of telescopic members.

According to an embodiment herein, a plurality of cage telescopic mechanism is nested.

According to an embodiment herein, a two cage telescopic mechanism is designed to nest with each other. One cage telescopic mechanism is designed to move an inside the interior ring of the far end member of the mechanism with respect to base member.

According to an embodiment herein, the plurality of telescopic members of the cage telescopic mechanism comprises an exterior ring connected to an interior ring through at least one connecting rod, but preferably two rods. Further, a plurality of linear joints equal to the number of connecting rods are evenly placed both at the interior perimeter of the exterior ring and at the exterior perimeter of interior ring.

According to an embodiment herein, the plurality of the telescopic members are coupled to each other through the connecting rods and joints. The plurality of the telescopic members are confined to move along a common axis. The connecting rods are designed to freely move respectively through the plurality of linear joints of the telescopic mechanism. The plurality of the linear joints are positioned at the free spaces provided between the connecting rods in the interior ring and the exterior ring. In the cage telescopic mechanism, all the telescopic members have equal cross section. The telescopic mechanism has identical joint distribution. The plurality of the telescopic members of the mechanism are joint or coupled or connected to each other along the circumference in which the telescopic members are arranged circumferentially with respect to each other at an offset angle.

According to an embodiment herein, the connecting rods of the base member are coupled to the joints of the exterior ring of the intermediate member. The joint of the interior ring of the base is coupled to the connecting rods of the intermediate member. All the telescoping members are coupled to each other in the extendable mechanism.

According to an embodiment herein, the extendable mechanism comprises a plurality of identical telescopic members. The telescopic members comprises a base member, an intermediate member and an end effect member. The base member, the intermediate member and the end effect member slide other along a common axis. The base member is attached or mounted on a moving base. The intermediate member is configured to move relatively with respect to the base member. The end effecter member is extended from the intermediate member. Further, the telescopic member comprises an exterior ring and an interior ring. The mechanism comprises three identical cylindrical rods connected to the exterior ring. The cylindrical rods are mounted perpendicular to the exterior ring and are aligned along the common axis of the telescopic members. The mechanism comprises the connecting rods which couple the interior ring and the exterior ring. The connecting rods are evenly distributed along an interior perimeter of the exterior ring with same angular distance. The connecting rods of the base member is coupled to the cylindrical holes of the exterior ring of the intermediate member. The mechanism comprises three cylindrical holes that are engraved with equal angular distance at the exterior wall of the interior ring. The diameter of the cylindrical holes is equal to the diameter of the connecting rods. The cylindrical holes are positioned with an angular distance of 80 degree with respect to position of the connecting rod. Further, the telescopic mechanism comprises three semi cylindrical holes engraved with an equal angular distance on the interior wall of the exterior ring. The diameter of the semi cylindrical holes is equal to the diameter of the connecting rods. The semi cylindrical holes are positioned with an angular distance of 40 degree with respect to position of the connecting rods.

FIG. 1 illustrates a perspective view of the of a cage telescopic mechanism with a plurality of telescopic members, according to an embodiment herein. The telescopic members are identical in design and radial circumference. The cage telescopic mechanism or extendable mechanism includes a plurality of telescopic members 10 that are aligned circumferentially. According to an embodiment, the cage telescopic mechanism includes at least three telescopic members 10 wherein one member is the fixed base 11 of the mechanism. Further, the members are coupled to each other in order to have linear sliding motion. For an optimal design, all the telescopic members are of the same size, but with different heights.

With respect to the cage telescopic mechanism of the FIG. 1, all the joints on the telescopic members are distributed in the same concentric layers. The identical telescopic members 10 are coupled to each other circumferentially with an angular rotation around the common axis of the motion. The telescopic members are arranged with an angular offset with respect to each other. Due to such a configuration, the telescoping members of the mechanism are not sealed off. Further, the telescopic members comprises two rings which are connected to each other through the connecting rods. Thus the telescopic mechanism provides high structural stiffness and high load capability for the cage telescopic mechanism. By translational motion of the telescopic members through each other, the telescopic mechanism is deployed to a given length. The reachable distance of the telescopic mechanism is extended by adding an extra intermediate members to the mechanism.

Figure 2:
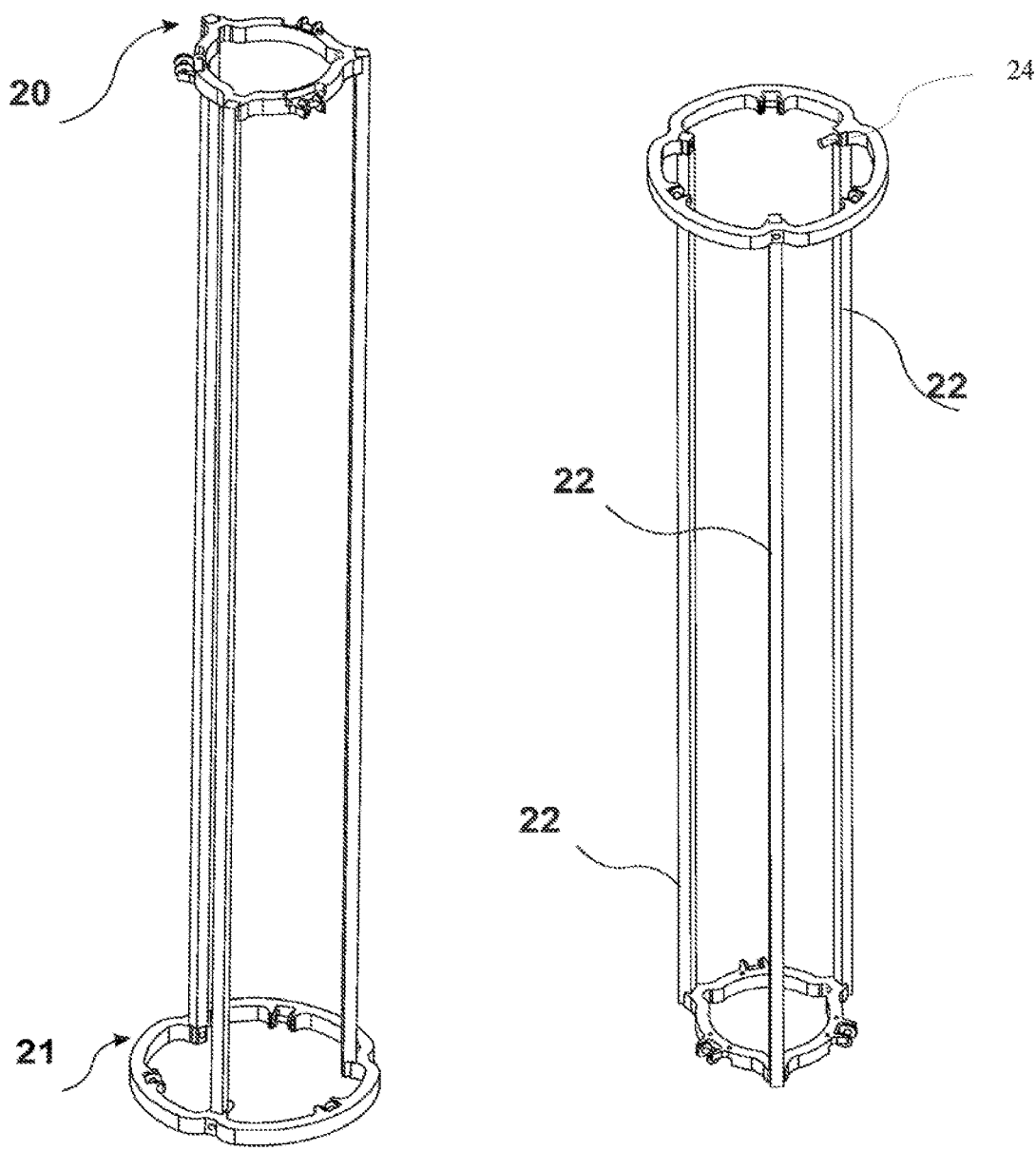
FIG. 2 illustrates a perspective view of a telescopic member of the cage telescopic mechanism, according to an embodiment herein.

FIG. 2 illustrates an exemplary telescoping member of the telescopic mechanism embodiment of FIG. 1 in two different views. Each member of the mechanism 10 comprised of a pair of parallel rings, that comprise the interior ring 20 and the exterior ring 21, which are rigidly connected to each other via at least one connecting rod 22. The exterior ring 21 provided with a brake member 24 is connected to the connecting rods 22 at one end while the interior ring is connected to the rods 22 at the other end. For structural stiffness and durability, as well as high load capability, at least two connecting rods are provided between the exterior and interior rings. The interior ring 20 is nested inside exterior ring 21. Thus two adjacent member of the mechanism is nested within each other. The geometrical shape of the rings are different in accordance with the number of connecting rods and specific design, and skilled ones in the art is able to propose similar design based on the description of the principles in the invention.

Figure 3A:
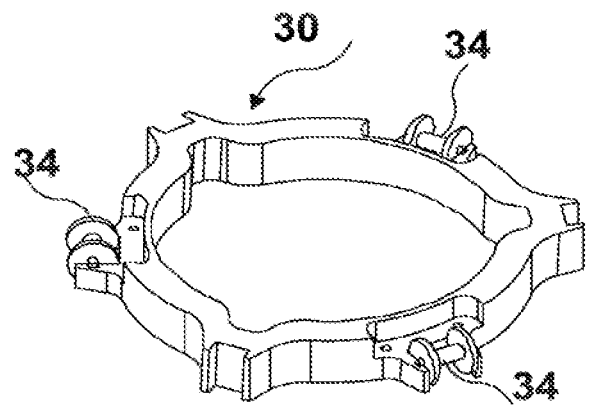
FIG. 3A is a perspective view of interior ring of the telescopic member, according to an embodiment herein.
Figure 3B:
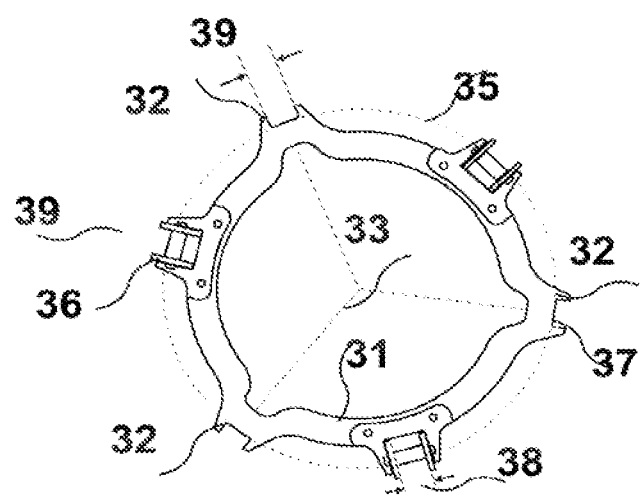
FIG. 3B is a top view of the interior ring of the telescopic member, according to an embodiment herein.

FIG. 3 illustrates the interior ring 30 of the mechanism wherein the FIG. 3-A provides an isometric view and FIG. 3-B shows the top view of the ring 31. The interior ring 31 comprises a ring or a disc shape plate, preferably symmetric, with the predefined places 32 on the exterior wall for mounting the connecting rods 22. The connecting rods are distributed at the exterior wall of the interior ring with equal angular distance 33 and equal radial distance with respect to the ring. The connecting rods are arranged symmetrically in the telescoping members. The radial distance of the all the attachment points 32 of the connecting rods are identical. Any telescopic member 10 has at least one connecting rod 22. For coupling the telescoping members, several joints 36 are placed at the exterior wall of the interior ring in the free spaces between two adjacent connecting rods which are arranged at the same radial distance as that of connecting rods. The angular distance of the two adjacent joints 36 is the same as that of connecting rods. The joints are placed with an angular offset with respect to the attachment points 32 of the connecting rods. The number of joints in the interior ring is equal to the number of connecting rods in each telescoping member.

Figure 4A:
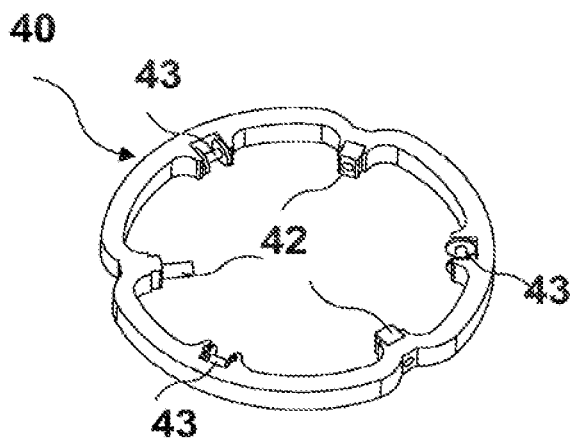
FIG. 4A illustrates a perspective view of an exterior ring of the telescopic member, according to an embodiment herein.
Figure 4B:
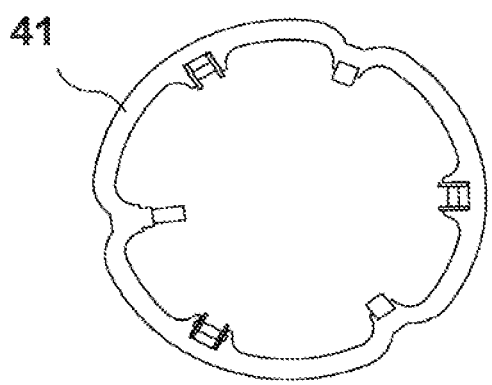
FIG. 4B is a top view of the exterior ring the telescopic member, according to an embodiment herein.

FIG. 4A illustrates a perspective view of an exterior ring of the telescopic member, according to an embodiment herein. FIG. 4B is a top view of the exterior ring shown in FIG. 4A.

With respect to FIG. 4A and FIG. 4B, the geometrical shape of the interior ring 30 completely lies at the void space inside the exterior ring 40. The exterior ring 40 comprises a ring shaped base 41 with the corresponding attachment point 42 for the connecting rods 22. The connecting rods are rigidly attached to the interior wall of the exterior ring 40. Several joints 53, equal to the number of connecting rods, are integrated on the interior wall of the exterior ring 40. The angular position of the joints in the exterior ring with respect to the connecting rods are at a different angle from that of interior ring.

Figure 5A:
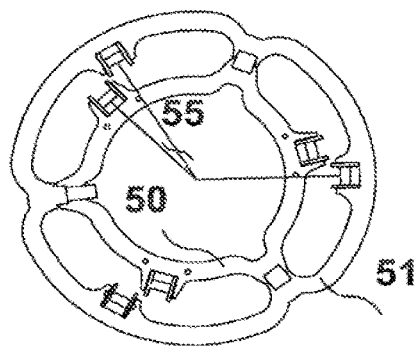
FIG. 5A and FIG. 5B illustrate a top view of the telescopic member with the clearance and required space for joint placement at the interior and exterior rings.
Figure 5B:
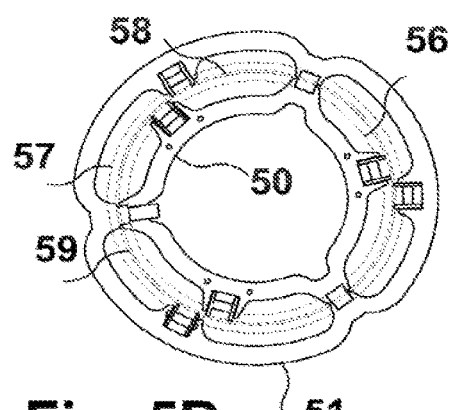
Figure 5C:
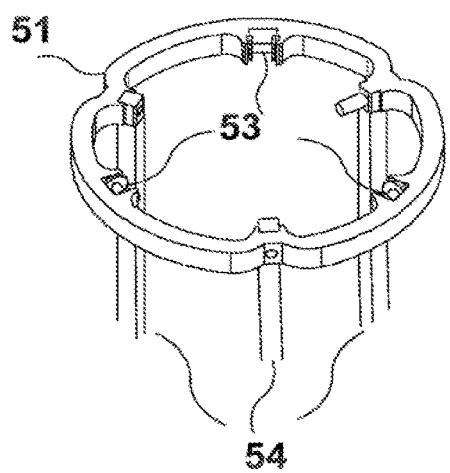
FIG. 5C is a partial perspective view of the telescopic member illustrating linear joints in interior and exterior rings as well as the connecting rods.
Figure 5C:
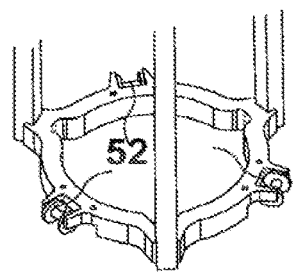

FIG. 5C illustrates a partial perspective view of the telescopic member illustrating linear joints in the interior ring 50 and exterior ring 51.

According to an embodiment herein, two adjacent members slide inside each other. The geometrical shape of the exterior ring 51 and interior ring 50 have a nested profile, in which the interior ring of one telescopic member is easily moved through the exterior ring of the adjacent member along the axis of the mechanism. Referring to the FIG. 5-B, the outermost tangent circle 58 of the interior ring 50 concentrically lies inside the innermost tangent circle 59 of the exterior ring 51. The angular arrangement of the joints in the exterior ring 51 and interior ring 50 are not the same. There is an angular offset 55 between the arrangement of the joints 52 in the interior ring and the arrangement of the joints 53 in the exterior ring. Further, the members are coupled to each other with sliding joints. The two adjacent members are coupled to each other through the connecting rods and the joints of the telescopic member. To fully constrain the telescopic members with respect to each other, the tangent circle 56 at the innermost surface of the connecting rods 54 and the surface of the joint at the interior ring 52 are the same to guarantee the linear sliding of the member without backlash. The same is said for the outermost tangent circle 57 to the surface of the connecting rods 54 and the tangent circle 57 to the surface of the joints 53 at the exterior ring 51.

Figures 6A, 6B:
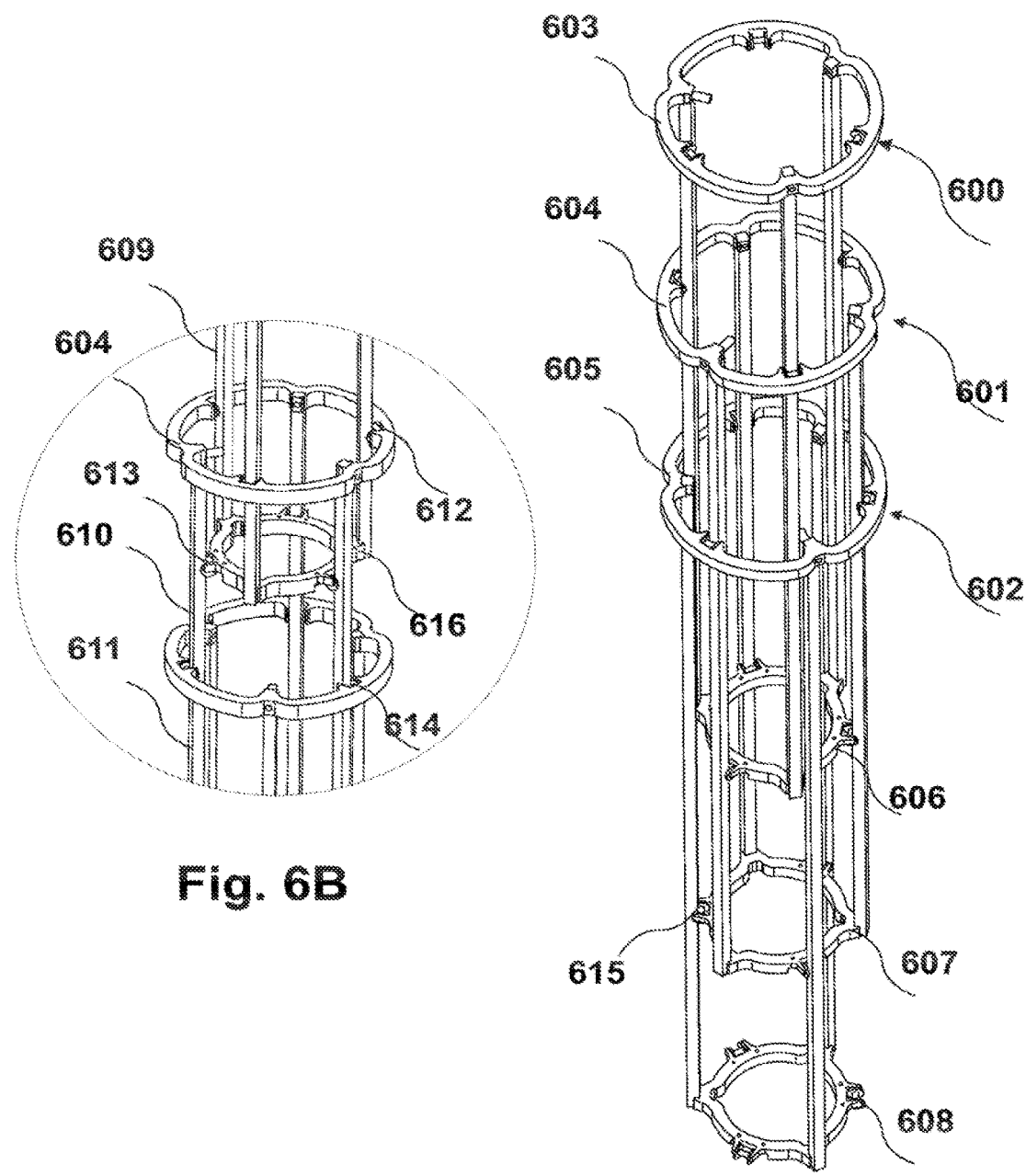
FIG. 6A is a perspective view of a cage telescopic mechanism including three telescopic members intercoupled to each other, according to another embodiment herein.
FIG. 6B is a partially magnified view of the telescopic members in the cage telescopic mechanism, according to another embodiment herein.

In the FIG. 6-A and FIG. 6-B, three successive members 600, 601 and 602 of the preferred embodiment of the invention and the method to couple the members to each other is illustrated. FIG. 6-A illustrates an isometric view of three inter-coupled members. FIG. 6-B illustrates a partial view of a magnified section of the FIG. 6-A. The telescopic mechanism comprises the base member 600, intermediate member 601 and end effecter member 602 respectively. The connecting rods 609 of the base member 600 are coupled to the joints 612 of the exterior ring 604 of the intermediate member 601 while the joints 613 of the interior ring 606 of the base member 600 is coupled to the connecting rods 610 of the intermediate member 61. With the same principle, the connecting rods 600 of the intermediate member 601 are coupled to the joints 614 of the exterior ring 605 of the end effecter member 602 while the joints 615 of the interior ring 607 of the intermediate member 601 are coupled to the connecting rods 611 of the end effecter 602.

As described earlier, the embodiment illustrated in the FIG. 1-6 is just to provide the concept of the invention and the mechanism is extended by adding extra intermediate members. The further most member of the mechanism with respect to the base member is referred to as the end effecter member and other members within the base and the end effecter member are named the first intermediate member, the second intermediate member and so on.

The embodiments herein provide a telescopic mechanism is used as an extendable portable mast or arm to position any payloads at a specified position. The payload is an antenna or a camera or any other surveillance system. There are numerous applications for telescopic mechanism in aerospace, ship industry, robotics and construction. Thus the mechanism provides high structural stiffness and high load capability for the cage telescopic mechanism.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications.

Although the embodiments herein are described with various specific embodiments, it will be obvious for a person skilled in the art to practice the embodiments herein with and without modifications.

What is claimed is:

1. An extendable mechanism with telescopic members, the mechanism comprising:
   a plurality of identical telescopic members, wherein the plurality of telescopic members comprise at least a base member, an intermediate member and an end effector member, and wherein the base member, the intermediate member and the end effector member are configured to slide with respect to one another along a common axis, and wherein the base member is attached or mounted, and wherein the intermediate member is configured to move relatively with respect to the base member, and wherein the end effector member is extended from the intermediate member, and wherein each telescopic member comprises an exterior ring and an interior ring;
   a plurality of connecting rods connected to the exterior ring and the interior ring of the each telescopic member, and wherein the plurality of connecting rods are arranged perpendicular to the exterior ring and wherein the plurality of connecting rods are aligned along a common axis of the plurality of telescopic members, wherein the plurality of connecting rods comprises at least two rods, and wherein the plurality connecting rods are evenly distributed along an interior wall of the exterior ring at an equal angular distance;
   a first set of three grooves with a cross section similar to that of the connecting rods engraved at an equal angular distance at the interior wall of the exterior ring along a circumference of a circle in which the connecting rods are distributed, and wherein the first set of three grooves has an angular offset of 40 degrees with respect to the position of the connecting rods in such a way that the rods of a neighboring telescopic member freely move along the grooves of an adjacent telescopic member without any interference with each other;
   a second set of three grooves engraved on an exterior wall of the internal ring at an equal angular distance, along the circumference of a circle in which the connecting rods are distributed, while having an angular offset of 80 degrees with respect to the position of the connecting rods in such a way that the rods of the neighboring telescopic member freely move along the grooves of the adjacent telescopic member without any interference with each other;
   a plurality of linear joints positioned both on an interior perimeter of the exterior ring and on an exterior perimeter of interior ring respectively, and wherein the plurality of linear joints is designed to make a translational motion; and
   a brake member mounted on the exterior rings to limit a movement of the plurality of telescopic members at an end.

2. The mechanism of claim 1, wherein the connecting rods of the base member are coupled respectively to the grooves/linear joints of the exterior ring of the intermediate member to allow a free movement through the grooves/linear joints.

3. The mechanism of claim 1, wherein the connecting rods have a circular cross section or a square cross section.

4. The mechanism of claim 1, wherein the connecting rods of the intermediate member are coupled respectively to the grooves/linear joints of the interior ring of the base member at one end and also to the exterior ring of the end effector member at another end, thereby allowing free movement through the grooves.

5. The mechanism of claim 1, wherein the plurality of telescopic members comprises two telescopic members.

6. The mechanism of claim 1, wherein a profile of the interior ring is designed to completely lie or nest inside an interior area of a profile of the exterior ring.

7. The mechanism of claim 1, wherein the plurality of telescopic members is more than three telescopic members and wherein the telescopic mechanism is further extended by adding a plurality of intermediate members.

8. The mechanism of claim 1, wherein the exterior ring and the interior ring are of any geometrical shape and wherein the interior ring is nested within the exterior ring.

9. The mechanism of claim 1, wherein the plurality of connecting rods has any cross section and wherein the cross section of the plurality of connecting rods provided between the exterior ring and the interior ring is similar.

10. The mechanism of claim 1, wherein a position of a far end of the telescopic member at the end effector is controlled through a relative motion of the plurality of the telescopic members with respect to each other along a common axis of movement.

11. The mechanism of claim 1, wherein the grooves are configured to include the linear joints to confine a movement of the plurality of telescopic members along the common axis.

12. The mechanism of claim 1, wherein the connecting rods of each telescopic member have a different or similar length with respect to the rods of the other telescopic members.

13. The mechanism of claim 1, wherein the plurality of linear joints is of a pulley type.

14. The mechanism of claim 1, wherein the plurality of telescopic members is driven with a motor or manually.

\* \* \* \* \*